(12) United States Patent
Yoshida et al.

(10) Patent No.: US 6,622,220 B2
(45) Date of Patent: Sep. 16, 2003

(54) SECURITY-ENHANCED NETWORK ATTACHED STORAGE DEVICE

(75) Inventors: Stuart Yoshida, Ft. Collins, CO (US); Robert P Martin, Ft. Collins, CO (US); Roland M Hochmuth, Ft. Collins, CO (US); Gary L. Thunquest, Berthoud, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 106 days.

(21) Appl. No.: 09/808,859

(22) Filed: Mar. 15, 2001

(65) Prior Publication Data

US 2002/0174307 A1 Nov. 21, 2002

(51) Int. Cl.⁷ .............................................. G06F 12/14
(52) U.S. Cl. ...................... 711/152; 711/148; 711/149; 711/153; 710/316; 709/224; 709/225; 370/392; 370/394
(58) Field of Search ................................ 711/148, 149, 711/152, 153; 710/316; 370/392, 394; 709/224, 225

(56) References Cited

U.S. PATENT DOCUMENTS

| | | | | |
|---|---|---|---|---|
| 5,619,497 A | * | 4/1997 | Gallagher et al. | 370/394 |
| 5,684,951 A | * | 11/1997 | Goldman et al. | 707/9 |
| 5,740,171 A | * | 4/1998 | Mazzola et al. | 370/392 |
| 5,832,274 A | * | 11/1998 | Cutler et al. | 717/169 |
| 6,070,243 A | * | 5/2000 | See et al. | 709/229 |
| 6,101,606 A | * | 8/2000 | Diersch et al. | 380/201 |
| 6,208,649 B1 | * | 3/2001 | Kloth | 370/392 |
| 6,357,010 B1 | * | 3/2002 | Viets et al. | 709/225 |
| 2001/0029534 A1 | * | 10/2001 | Spinks et al. | 709/224 |

* cited by examiner

Primary Examiner—Hiep T. Nguyen

(57) ABSTRACT

A security-enhanced network storage device. Apparatus and methods disclosed which allow network-connected client systems or groups of such systems to access data storage devices over the network in a highly secure fashion. Systems not having the appropriate permission are excluded from access. Characteristics of such a network attached storage device include the following: (1) Clients can only access the data they have been given permission to access, based on a combination of access control lists and physical system interconnects. (2) Client data access permissions in representative embodiments are stored and managed on the security-enhanced network attached storage device and are not accessible by clients, thereby improving data security. (4) Client access permissions can be checked on a per-IP-packet basis, so that all data transfers can be validated before they occurs, thus also, improving data security. (5) Clients interact with security-enhanced network attached devices in essentially the same manner with which they interact with traditional network-based file systems. (6) In addition, new individual client systems can be automatically given access to appropriate storage by adding them to the client grouping without having to update an access control list which is maintained in the security-enhanced network attached storage device.

27 Claims, 4 Drawing Sheets

```
PORT TO ADDRESS
TRANSLATION

PORT P1 <-> 10.20.2.3
PORT P2 <-> 10.20.2.4
PORT P3 <-> 10.20.2.5
PORT P4 <-> 10.20.2.6
PORT P5 <-> 10.20.2.7
PORT P6 <-> 10.20.2.19
```
— 145

*FIG. 4A*

```
ACCESS CONTROL LIST

FIRST STORAGE STRUCTURE S1
    10.20.2.6

SECOND STORAGE STRUCTURE S2
    10.20.2.3 - 10.20.2.5

THIRD STORAGE STRUCTURE S3
    10.20.2.7, 10.20.2.19
    10.20.2.3 - 10.20.2.5
```
— 150

*FIG. 4B*

SECURITY-ENHANCED NETWORK ATTACHED STORAGE DEVICE

FIELD OF THE INVENTION

The present invention relates generally to networks of computers and, more particularly, to storage devices attached to such networks commonly referred to as network attached storage devices, and even more particularly to the security of such devices.

BACKGROUND OF THE INVENTION

As computers and computer systems have become more and more capable of performing increasingly complicated tasks, the data which they create, the data upon which their tasks depend, and the data which they wish to store has also increased resulting in an expanded need for more data storage space. The advent of network access to this data complicates the situation as now there is a need for shared data storage space with an associated need for the stored data to be secure from those not having appropriate authorization.

In order to provide this shared storage space, network attached storage (NAS) devices have provided a rapidly emerging new technology for workstations and servers. A network attached storage device is a self-contained, intelligent storage appliance that attaches directly to a local area network (LAN) and transfers data typically over network standard protocols such as Transmission Control Protocol/Internet Protocol (TCP/IP) or Internet Packet Exchange (IPX) also typically using industry standard file sharing protocols such as Server Message Block (SMB), Common Internet File System (CIFS), Network Control Protocol (NCP), Apple File Protocol AFP, Network File System (NFS), or Hypertext Transfer Protocol (HTTP). The current, modern technology typically uses commodity hard-disks and custom controllers to create file systems which are self-configuring so that they appear automatically on the network.

In those environments wherein service providers host servers from multiple customers on their network, and each customers' server stores and accesses data stored on a shared network attached storage device, richer security mechanisms are needed to ensure privacy. In these environments, since the customers control their own servers, they are inherently insecure and untrustworthy from the service provider's standpoint. This, coupled with the fact that current file access protocols base their security on server IP address settings, creates an environment wherein one customer could modify their server to impersonate another customer's server and gain access to the latter's data. This situation would be a serious, unacceptable breach in security. Thus, there exists an unacceptable potential security problem that needs to be eliminated.

One solution to this potential security problem is to forbid the sharing of network attached storage devices among customers. This solution would eliminate the potential security problem, but has the down side that it is much more expensive, as each customer must then have its own dedicated, network attached storage device. Another technique that has been used in attempting to eliminate the security problems associated with network attached storage devices is to setup a trusted third party for security authentication and verification. Examples of this would be to use a Sun NIS server, or Microsoft Domain Controller. These solutions, however, are intrusive on the customer's security setup, which is generally impractical. They also push the security burden back onto the customer which is undesirable.

Thus, in a multi-customer, network environment where data security is very important, there is a need for means to significantly improving the security of storage devices attached to the network.

SUMMARY OF THE INVENTION

The present patent document relates to novel methods for controlling secure access to storage devices attached to computer system networks. Network attached storage (NAS) systems are inherently insecure. Previous methods for controlling such access have relied upon Internet Protocol (IP) source address checking at the beginning of a series of file system transactions. There are several problems with this approach to security in a multi-client environment. It is possible for clients to change the IP addresses on their systems, thus "impersonating" other clients' systems and obtaining access to data that they do not have permission to access. In addition, after an initial client identity check many quanta of data can be exchanged before the client identity is re-verified, thus opening the door for client spoofing. This exacerbates the problem described above.

Embodiments disclosed in the present patent document eliminate these potential security problems by not trusting the customer's server IP address, but rather utilizing trusted network elements to identify which customer is making a storage request at the network attached storage device. Such a security enhanced network attached storage device (SENAS) either (1) uses the network element's provided identity, not the customer server's provided identity, or (2) uses the client supplied identity but validated by the network element when determining what access rights will be granted. That is in order to insure security, an immutable tag is associated with each physical client. The security enhanced storage device recognizes this tag and bases access to the data stored on it based on this tag. This solution has the advantages that (1) it is secure, (2) it allows the service provider to lower their cost by sharing NAS devices between customers, and (3) it does not impact the customer's own security settings or practices among their own servers.

In representative embodiments, methods disclosed in the present patent document allow network-connected client systems or groups of such systems to access data storage devices over the network in a highly secure fashion. Systems not having the appropriate permission are excluded from access. Characteristics of such a network attached storage device include the following: (1) Clients can only access the data they have been given permission to access, based on a combination of access control lists and physical system interconnects. Typically a given client is given access to only their data and no other client's data. However, embodiments disclosed herein allow multiple specific clients to have access to the same data. (2) Client data access permissions in representative embodiments are stored and managed on the security-enhanced network attached storage device and are not accessible by clients, thereby improving data security. (4) Client Access permissions can be checked on a per-IP-packet basis, so that all data transfers can be validated before they occur, thus also, improving data security. (5) In representative embodiments, security-enhanced network attached devices are not intrusive to the client, i.e., the only changes required to software systems is to the file server not to the client. Thus, changes required to the system are transparent to the client. Clients interact with security-enhanced network attached devices in essentially the same manner with which they interact with traditional network-based file systems. (6) In addition, new individual client systems can be automatically given access to appropriate storage by adding them to the client grouping without having to update an access control list which is maintained in the security-enhanced network attached storage device.

Embodiments disclosed use port-based VLANs which cannot be subverted by users attached at client nodes. By contrast, tag-based VLANs typically involve the client network interface card in creation of the tag in the IP stream. And it would, therefore, be possible for a client to subvert a tag-based VLAN by adjusting the network interface card. However, tag-based VLANs could still be used provided (1) that the network device validates that the identity is correct at the port level which could be accomplished, for example, by checking that the packet from a particular port has the correct tag associated with it or (2) that the network assigns the tag in which case the tag cannot be subverted.

Other aspects and advantages of the present invention will become apparent from the following detailed description, taken in conjunction with the accompanying drawings, illustrating by way of example the principles of the invention.

BRIEF DESCRIPTION OF THE DRAWINGS

The accompanying drawings provide visual representations which will be used to more fully describe the invention and can be used by those skilled in the art to better understand it and its inherent advantages. In these drawings, like reference numerals identify corresponding elements and:

FIG. 4A is a drawing of another port translation table as described in various representative embodiments of the present patent document.

FIG. 4B is a drawing of another access control list as described in various representative embodiments of the present patent document.

DETAILED DESCRIPTION OF THE PREFERRED EMBODIMENTS

1. Introductory Comments

Figure 1:
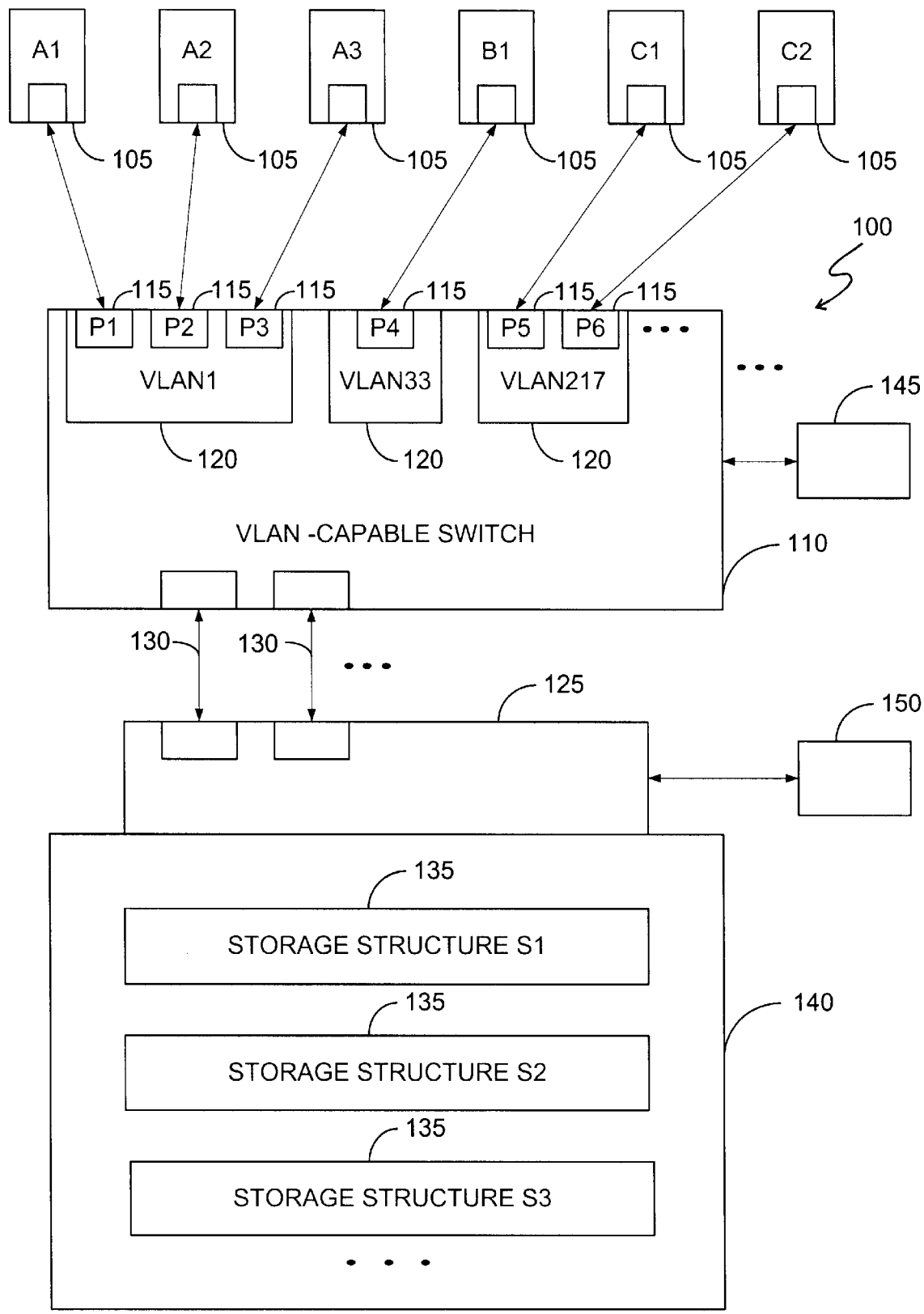
FIG. 1 is a drawing of a network attached storage device as described in various representative embodiments of the present patent document.

As shown in the drawings for purposes of illustration, the present patent document relates to novel methods for controlling secure access to storage devices attached to computer system networks. Network attached storage (NAS) systems are inherently insecure. Previous methods for controlling such access have relied upon Internet Protocol (IP) source address checking at the beginning of a series of file system transactions. There are several problems with this approach to security in a multi-client environment. It is possible for clients to change the IP addresses on their systems, thus "impersonating" other clients' systems and obtaining access to data that they do not have permission to access. In addition, after an initial client identity check many quanta of data can be exchanged before the client identity is re-verified, thus opening the door for client spoofing. This exacerbates the problem described above.

Embodiments disclosed in the present patent document eliminate these potential security problems by not trusting the customer's server IP address, but rather utilizing trusted network elements to identify which customer is making a storage request at the network attached storage device. Such a security enhanced network attached storage device (SENAS) either (1) uses the network element's provided identity, not the customer server's provided identity, or (2) uses the client supplied identity but validated by the network element when determining what access rights will be granted. That is in order to insure security, an immutable tag is associated with each physical client. The security enhanced storage device recognizes this tag and bases access to the data stored on it based on this tag. This solution has the advantages that (1) it is secure, (2) it allows the service provider to lower their cost by sharing NAS devices between customers, and (3) it does not impact the customer's own security settings or practices among their own servers.

In the following detailed description and in the several figures of the drawings, like elements are identified with like reference numerals.

2. Definitions

As used in the present patent document, the following terms are understood to have the meanings indicated beside them.

Client

Any electronic device, as for example an individual computer system, connected to a network which may require access to a storage system attached to the network.

Data Storage Device

A physical device intended for the storage of data. A storage device can comprise one or more storage structures.

Group of Clients

A compilation of clients performing a related function or functions and having access to common computer resources which in the present patent document relates to a common storage structure or structures.

Storage Structure

A physical or logical device for the storage of data. This structure could comprise a complete physical or logical device, a file system, a file directory, or a file located on the data storage device.

User

An end customer of a storage system attached to a network. Typically the owner of one or more clients.

VLAN

A virtual local area network. A VLAN can comprise a group of clients which has access to a common storage structure or structures. Thus a VLAN can be used on a network to isolate a group of computers that use the network to which they are connected to communicate with each other but do not want to have visibility from other computers outside that local network. A VLAN could, for example, comprise a group of systems that belong to a single client.

3. Discussion

In representative embodiments, methods disclosed in the present patent document allow network-connected client systems or groups of such systems to access data storage devices over the network in a highly secure fashion. Systems not having the appropriate permission are excluded from access. Characteristics of such a network attached storage device include the following: (1) Clients can only access the data they have been given permission to access, based on a combination of access control lists and physical system interconnects. Typically a given client is given access to only their data and no other client's data. However, embodiments disclosed herein allow multiple specific clients to have access to the same data. (2) Client data access permissions in representative embodiments are stored and managed on the security-enhanced network attached storage device and are not accessible by clients, thereby improving data security. (4) Client Access permissions can be checked on a per-IP-packet basis, so that all data transfers can be validated before they occur, thus also, improving data security. (5) In representative embodiments, security-enhanced network attached devices are not intrusive to the client, i.e., the only changes required to software systems is to the file server not to the client. Thus, changes required to the system are transparent to the client. Clients interact with security-enhanced network attached devices in essentially the same manner with which they interact with traditional network-based file systems. (6) In addition, new individual client systems can be automatically given access to appropriate storage by adding them to the client grouping without having to update an access control list which is maintained in the security-enhanced network attached storage device.

Embodiments disclosed in the following sections use port-based VLANs which cannot be subverted by users attached at client nodes. By contrast, tag-based VLANs typically involve the client network interface card in creation of the tag in the IP stream. And it would, therefore, be possible for a client to subvert a tag-based VLAN by adjusting the network interface card. However, tag-based VLANs could still be used provided (1) that the network device validates that the identity is correct at the port level which could be accomplished, for example, by checking that the packet from a particular port has the correct tag associated with it or (2) that the network assigns the tag in which case the tag cannot be subverted.

3.1 VLAN-Capable Switch Embodiment

FIG. 1 is a drawing of a network attached storage device 100 as described in various representative embodiments of the present patent document. The network attached storage device 100 is also referred to herein as data storage system 100. In FIG. 1, clients 105 which are individual computer systems represented in this figure as first client A1, second client A2, third client A3, fourth client B1, fifth client C1, and sixth client C2, are connected to a switch 110, also referred to herein as a first electronic device 110, which in this figure is a VLAN-capable switch 110. The VLAN-capable switch 110 is a device that enables creation of isolated virtual local area networks and permits them to be associated with specific physical network ports 115 represented in FIG. 1 as first port P1, second port P2, third port P3, fourth port P4, fifth port P5, and sixth port P6. Network traffic that originates from a specific port 115, and thereby from a specific client 105, can be identified via a VLAN identification label 120 which indicates which VLAN that client 105 belongs to. VLAN identification labels 120 shown in FIG. 1 are examples for illustrative purposes only and do not imply physical bonding of associated ports 115. In the example of FIG. 1, first, second, and third ports P1, P2, P3 are identified as being connected to a first virtual local area network VLAN1, fourth port P4 is identified as being connected to a second virtual local area network VLAN33, and fifth and sixth ports P5,P6 are identified as being connected to a third virtual local area network VLAN217 by VLAN identification labels 120. In a representative embodiment virtual local area networks VLAN1, VLAN33, and VLAN217 are subnets, and in a particular example of such an embodiment, first virtual local area network VLAN1 could be addresses, for example, in the range of 10.20.1.0/24, second virtual local area network VLAN33 could be, for example, addresses in the range of 10.20.33.0/24, and third virtual local area network VLAN217 could be, for example, addresses in the range of 10.20.217.0/24.

The VLAN-capable switch 110 is connected to a network interface/controller 125, also referred to herein as an interface/controller 125 and as a second electronic device 125, via one or more connections 130. The network interface/controller 125 in turn controls data flow to and from a data storage device 140 which comprises storage structures 135 which in the example of FIG. 1 are identified as first storage structure S1, second storage structure S2, and third storage structure S3. Network storage commands and data are passed to the clients 105 via the VLAN-capable switch 110 to the network interface/controller 125 which passes them onto the storage structures 135 of the data storage device 140. The storage structures 135,S1,S2,S3 can be physical or logical devices for the storage of data. These structures could comprise a complete physical or logical device, a file system, a file directory, or a file located on the data storage device. The network interface/controller 125 provides a traditional network connection as well as management of the storage structures 135,S1,S2,S3.

The network attached storage device 100 also comprises a port translation table 145, also referred to herein as a table 145, which communicates with the switch 110 and which in the example of FIG. 1 is a port-to-VLAN table 145 for associating ports with VLAN's and an access control list 150, also referred to herein as a list 150, which communicates with the network interface/controller 125 and which associates storage structures 135 with particular VLAN identification labels 120.

The three dark ellipses to the right of the ports P1 . . . P6 and the VLAN identification labels 120 indicate that the ports P1 . . . P6 can be replicated as needed for capacity and other reasons. The three dark ellipses to the right of the VLAN-capable switch 110 also indicate that it can be replicated as needed for capacity and other reasons. And finally, the three dark ellipses to the right of the connections 130 also indicate that they can be replicated as needed for capacity and other reasons.

Figure 2A:
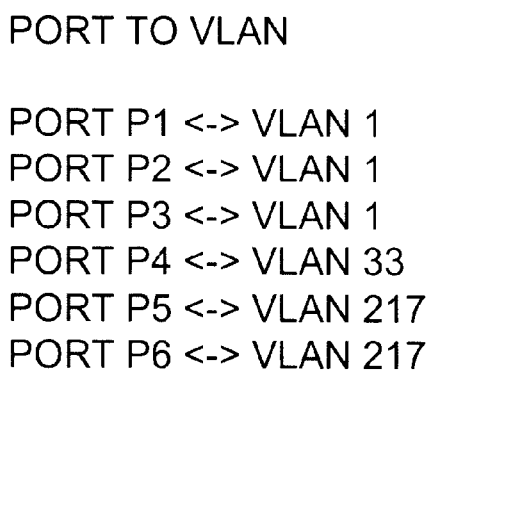
FIG. 2A is a drawing of a port translation table as described in various representative embodiments of the present patent document.

FIG. 2A is a drawing of the port translation table 145 as described in various representative embodiments of the present patent document. The embodiment of the port translation table 145 of FIG. 2A which shows detail not included in FIG. 1 is port-to-VLAN table 145. In the example of FIG. 2A and as also shown in FIG. 1, first, second, and third ports P1,P2,P3 are identified as being connected to the first virtual local area network VLAN1, fourth port P4 is identified as being connected to the second virtual local area network VLAN33, and fifth and sixth ports P5,P6 are identified as being connected to the third virtual local area network VLAN217 by VLAN identification labels 120. FIG. 2A is shown for illustrative purposes only. The contents of port-to-VLAN table 145 are implementation dependent.

Figure 2B:
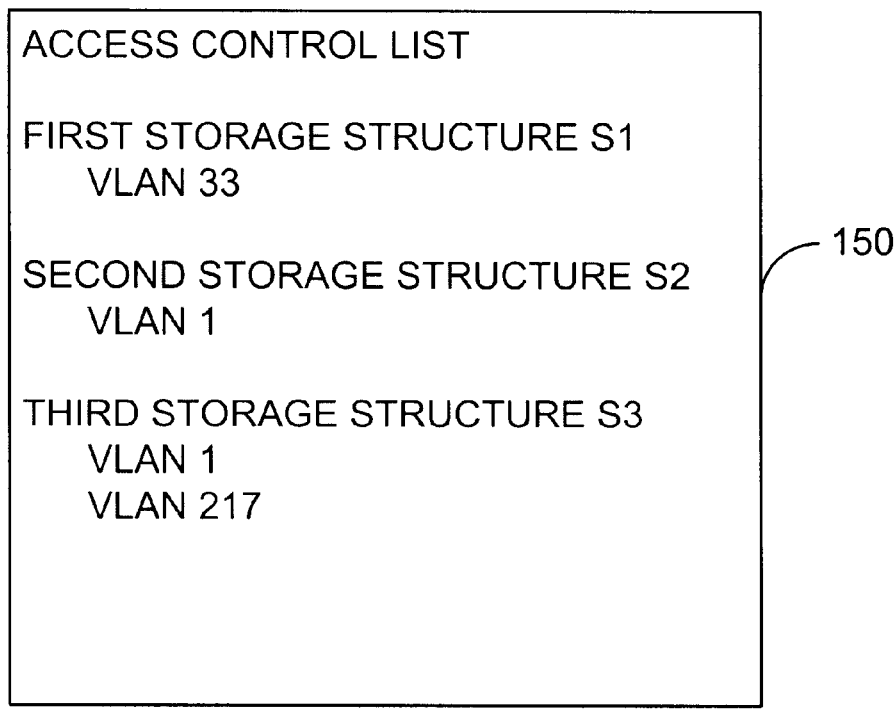
FIG. 2B is a drawing of an access control list as described in various representative embodiments of the present patent document.

FIG. 2B is a drawing of the access control list 150 as described in various representative embodiments of the present patent document. The embodiment of the access control list 150 of FIG. 2B shows detail not included in FIG. 1. In the example of FIGS. 1 and 2B, first storage structure S1 is identified as being accessible by second virtual local area network VLAN33, second storage structure S2 is identified as being accessible by first virtual local area network VLAN1, and third storage structure S3 is identified as being accessible by first virtual local area network VLAN1 and also by third virtual local area network VLAN217. Requests for access to any of the storage structures 135 shown in FIG. 1 by any other client 105 associated with any other VLAN will be denied. Also, as an example, a request for access to first storage structure S1 by first virtual local area network VLAN1 will be denied.

As an example, suppose fifth client C1 requests access to data in third storage structure S3. In a network file system environment, fifth client C1 would generate an IP packet identifying itself with a destination address associated with third storage structure S3 and a request for an element of data stored in third storage structure S3. The VLAN-capable switch 110 would note that the network traffic came from fifth port P5, look in the port-to-VLAN table 145, discover that fifth port P5 is associated with the third virtual local area network VLAN 217 and add the appropriate VLAN identification label 120 for the third virtual local area network VLAN217 to the IP packet and pass the packet along to the interface/controller 125.

The network interface/controller 125 of the security-enhanced network attached storage device 100 sees the packet and notes the request to access third storage structure S3. The network interface/controller 125 looks in its access control list 150 to determine if the request from this particular VLAN to access third storage structure S3 is permitted. In this case it is and access is granted, presumably resulting in a transfer of data from third storage structure S3 back through the VLAN-capable switch 110 to fifth client C1.

Note that the return data IP packets are tagged with the VLAN identification label 120 indicating association with the third virtual local area network VLAN217 in this case in addition to the IP address of fifth client C1.

Note that the port-to-VLAN table 145 in the VLAN-capable switch 110 allows multiple physical ports P1 . . . P6 to be associated with a given virtual local area network VLAN1,VLAN33,VLAN217. Thus, clients A1 . . . A3,B1, C1 . . . C2 connected to these ports P1 . . . P6 can have access to the same data in the security-enhanced network attached storage device 100, although this device 100 still allows traditional fine-grained access control at the file/directory level, even within a common group of clients A1 . . . A3,B1,C1 . . . C2.

3.2 Port to Address Translation Embodiment

Figure 3:
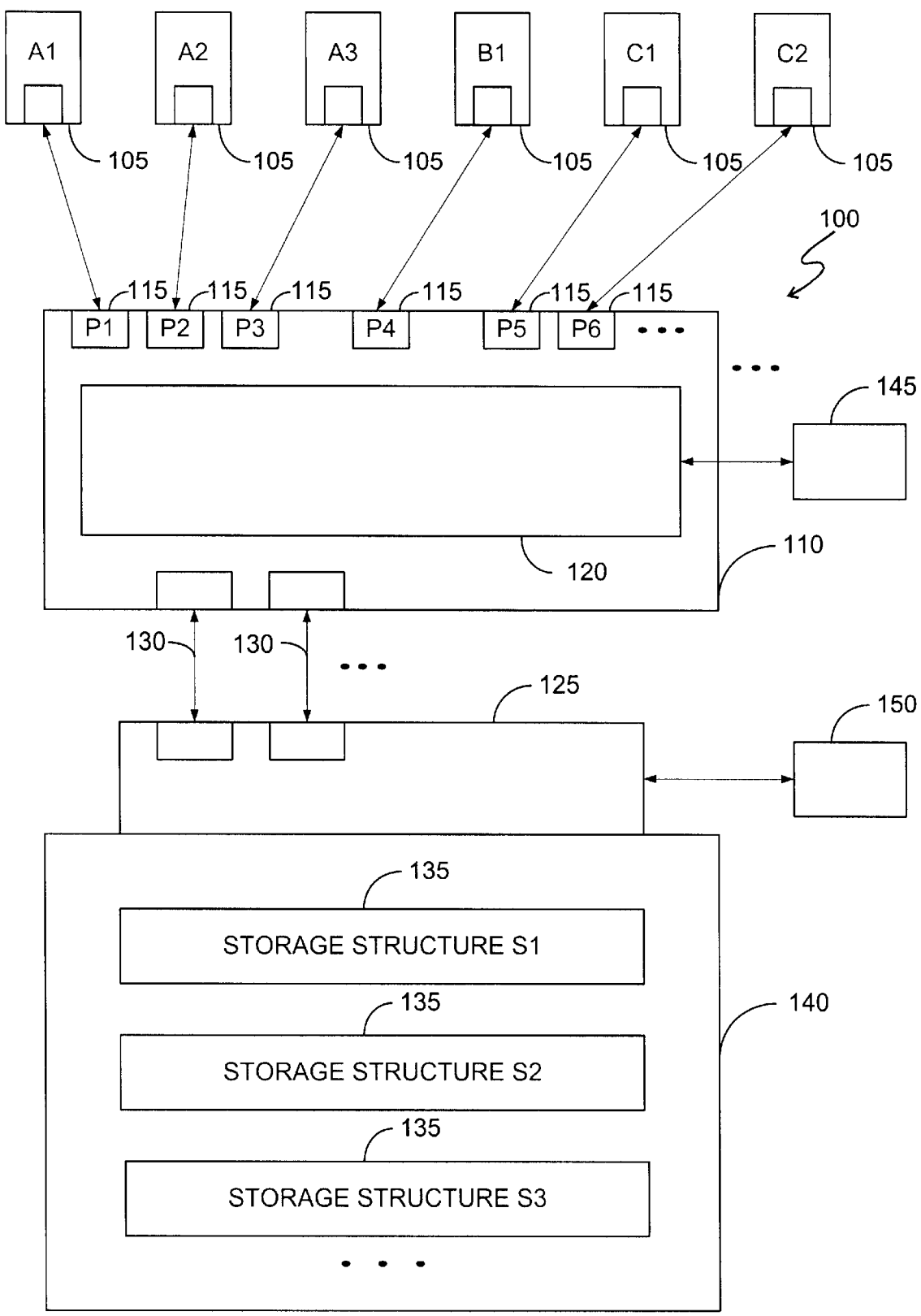
FIG. 3 is a drawing of another network attached storage device as described in various representative embodiments of the present patent document.

FIG. 3 is a drawing of another network attached storage device 100 as described in various representative embodiments of the present patent document. In the embodiment of FIG. 3, the switch 110 is implemented as port to address translation switch (PAT) 110. In this embodiment the physical ports P1 . . . P6 of the switch 110 are associated with specific IP addresses instead of the virtual local area networks VLAN1,VLAN33,VLAN217 as in FIG. 1. In the embodiment of FIG. 3, the grouping of client systems A1 . . . A2,B1,C1 . . . C2 moves into the access control list 150 in the security-enhanced network attached storage device 100.

In FIG. 3, clients 105 which are individual computer systems represented in this figure as first client A1, second client A2, third client A3, fourth client B1, fifth client C1, and sixth client C2, are connected to the switch 110 which in this figure is the port to address translation switch 110. The port to address translation switch 110 is a device that enables connection of specific physical ports P1 . . . P6 to specified IP addresses via table 145 which in this embodiment is the port to address translation (PAT) table 145 and permits them to be associated with specific physical network ports 115 represented in FIG. 3 as first port P1, second port P2, third port P3, fourth port P4, fifth port P5, and sixth port P6.

Similar to that of FIG. 1, the port to address translation switch 110 is connected to the network interface/controller 125 via one or more connections 130. The network interface/controller 125 in turn controls data flow to and from the data storage device 140 which comprises storage structures 135 identified as first storage structure S1, second storage structure S2, and third storage structure S3. Network storage commands and data are passed to and from the clients 105 via the port to address translation switch 110 to the network interface/controller 125 which passes them onto the storage structures 135 of the data storage device 140. Again these storage structures 135,S1,S2,S3 could comprise a complete physical or logical device, a file system, a file directory, or a file located on the data storage device. The network interface/controller 125 provides a traditional network connection as well as management of the storage structures 135,S1,S2,S3.

The network attached storage device 100 also comprises the port translation table 145, which communicates with the switch 110 and which in the example of FIG. 3 is a port to address translation table 145 and the access control list 150, which communicates with the network interface/controller 125 and which associates storage structures 135 with particular network addresses.

The three dark ellipses to the right of the ports P1 . . . P6 in the port to address translation switch 110 indicate that the ports P1 . . . P6 can be replicated as needed for capacity and other reasons. The three dark ellipses to the right of the port to address translation switch 110 also indicate that it 110 can be replicated as needed for capacity and other reasons. And finally, the three dark ellipses to the right of the connections 130 indicate that they can be replicated as needed for capacity and other reasons.

FIG. 4A is a drawing of another port translation table 145 as described in various representative embodiments of the present patent document. The embodiment of the port translation table 145 of FIG. 4A which shows detail not included in FIG. 1 is port to address translation table 145. In the example of FIG. 4A and as shown in FIG. 3, the port to address translation table 145 identifies first port P1 as connected to IP address 10.20.2.3, second port P2 as connected to IP address 10.20.2.4, third port P3 as connected to IP address 10.20.2.5, fourth port P4 as connected to IP address 10.20.2.6, fifth port P5 as connected to IP address 10.20.2.7, and sixth port P6 as connected to IP address 10.20.2.19. FIG. 4A is shown for illustrative purposes only. The contents of the port to address translation table 145 are implementation dependent.

FIG. 4B is a drawing of another access control list 150 as described in various representative embodiments of the present patent document. In the example of FIG. 4B, first storage structure S1 is identified as being accessible by IP address 10.20.2.6, second storage structure S2 is identified as being accessible by IP addresses 10.20.2.3 through 10.20.2.5 inclusive, and third storage structure S3 is identified as being accessible by IP addresses 10.20.2.3 through 10.20.2.5 inclusive, 10.20.2.7, and 10.20.2.19.

As an example, suppose fifth client C1 makes a request to access the third storage structure S3, the port to address translation device 110 looks in the port to address translation table 145 and determines that the source IP address should be 10.20.2.7. The IP Source Address of the request packet is thus replaced with 10.20.2.7 and the resulting packet is passed along to the interface/controller 125. The interface/ controller 125 notes that it is the third storage structure S3 being requested and checks that the source IP address is enabled for third storage structure S3. In this case source IP address 10.20.2.7 is allowed access to third storage structure S3 and the request is serviced. The data is returned through the port to address translation switch 110 to fifth client C1.

Other variations and extensions to access to the security-enhanced network attached storage device 100 are also possible. In particular, (1) any other means of associating client systems A1 . . . A3,B1,C1 . . . C3 with immutable identification which the security-enhanced network attached storage device 100 can recognize can be used to determine access rights; (2) while the access control lists 150 in the figures comprise examples which have a binary result (access or no access), the concept of different access types can be added to this model, including, but not limited to, the traditional UNIX "Read/Write/Execute" types of privileges; and (3) the VLAN Capable Switch 110 or the port to address translation switch 110 and the security-enhanced network attached storage device 100 can easily be implemented as a single physical device.

3.3 Method to Control Access to Storage Volumes

The present patent document discloses access verification methods for security control in network attached storage devices to control access to storage volumes (physical volumes, logical volumes, or file-systems) based on IP address (layer 3) or Media Access Control (MAC) address (layer 2). A MAC address is a hardware address that uniquely identifies each node of a network. The methods described herein work by applying an access-control list on each incoming IP address or MAC address and target storage structures simultaneous. The IP packet that arrives at the storage device must be opened up and checked to see what storage volume is being accessed.

Advantages of the present methods over other approaches are that (1) it can be applied independently of the file-system type and (2) file system enhancements are not required.

Pseudo-code describing the method used on the security-enhanced network attached storage device 100 for IP address and storage volume check is found in Table 1 and for VLAN identifier and storage volume check is found in Table 2. An example of a command to access the access control list 150 is found in Table 3.

TABLE 1

IP Address and Storage Volume Check

For all incoming IP packets
  if the source IP address AND the storage structure
  access are permitted then
    process further
  else
    if logging is enabled then
      log the denied storage request
    if security alerts are enabled then
      trigger the alarm
    disable further processing of the packet

TABLE 2

VLAN Identifier AND Storage Volume Check

For all incoming ethernet packets
  if the source VLAN identifier AND storage structure
  access are permitted then
    process further
  else
    if logging is enabled then
      log the denied storage request
    if security alerts are enabled then
      trigger the alarm
    disable further processing of the packet

TABLE 3

Example Access-List Command for Network Attached Storage Device

Access-list access-list-number {permit | deny} source-address [wildcard-mask]
  {destination-physical-volume | destination-logical-volume | destination-dir |
destination-file}

In the command format of Table 3, (1) access-list-number identifies the list to which the entry belongs, (2) "permit/deny" indicates whether this entry allows or blocks traffic from the specified address, (3) source-address identifies the source IP address, (4) wildcard-mask identifies which bits in the address field are matches—the default mask is 0.0.0.0 (match all bits), (5) destination-physical-volume identifies the physical volume access is granted to, (6) destination-logical-volume identifies the logical volume that access is granted to, (7) destination-dir identifies the file system directory that access is granted to, (8) destination-file identifies the file system file that access is granted to. All access lists end with an implicit deny any statement. Traffic that does not match previous statements are denied access.

3.3.1 Example 1—Access List that Permits a IP Sub-net Access to a Physical Volume In this example systems on the 10.10.1.0/24 sub-net will be permitted access to the physical volume/dev/hd0. All other IP address not on this sub-net will be implicitly denied access to this physical volume.

access-list 1 permit 10.10.1.0 0.0.0.255 destination-physical-volume/dev/hd0

3.3.2 Example 2—Access List that Permits a IP Sub-net Access to a File System Directory In this example systems on the 10.10.2.0/24 sub-net will be permitted access to the file system directory/foo.

access-list 2 permit 10.10.2.0 0.0.0.255 destination-dir/foo 3.3.3 Example 3—Access Lists that Permits 2 IP Sub-nets Access to Different Directories In this example computer systems on the 10.10.3.0/24 sub-net will be permitted access to the file system director/foo. Computer systems on the 10.10.4.0/24 sub-net will be permitted access to the file system directory/bar.

access-list 3 permit 10.10.3.0 0.0.0.255 destination-dir/foo access-list 4 permit 10.10.4.0 0.0.0.255 destination-dir/bar 3.3.4 Example 4—Access List that Permits an IP Sub-net Access to 2 Directories access-list 5 permit 10.10.5.0 0.0.0.255 destination-dir/foo access-list 5 permit 10.10.5.0 0.0.0.255 destination-dir/bar 3.3.5 Example 5—Access List that Permits 2 IP Sub-nets Access to the Same Directory access-list 5 permit 10.10.6.0 0.0.0.255 destination-dir/foo access-list 5 permit 10.10.7.0 0.0.0.255 destination-dir/foo 4. Summary & Concluding Remarks Previous network attached storage devices rely on IP source address checking at the beginning of a series of file system transactions. There are several problems with this approach to security in a multi-client environment. First, it is possible for clients 105, to change the IP addresses on their systems, thus "impersonating" other clients' systems and gaining access to data that they do not have permission to access. Second, after an initial client identity check many quanta of data can be exchanged before the client identity is re-verified, thus opening the door for client spoofing. This exacerbates the problem described above.

In the preferred embodiment of the method described in the present patent document, methods and apparatus for enhancing the security of network attached storage devices 100 is disclosed. A primary advantage of the embodiment as described in the present patent document over prior apparatus and methods is the ability to prevent the client systems from changing their IP addresses and thus fooling the network attached storage device 100 into believing that it is another system which has permission for access. Techniques other than the particular examples described herein can be used to ensure that the appropriate level of file access permission is provided to requests.

While the present invention has been described in detail in relation to preferred embodiments thereof, the described embodiments have been presented by way of example and not by way of limitation. It will be understood by those skilled in the art that various changes maybe made in the form and details of the described embodiments resulting in equivalent embodiments that remain within the scope of the appended claims.

What is claimed is:

1. A data storage system, comprising:
   a data storage device, having capability of comprising more than one storage structure;
   a switch, comprising more than one port, wherein the ports are individually attachable to separate network systems and wherein the switch has capability of receiving at one of its ports a request for access to one of the storage structures, and of identifying the network system making the request based on knowledge of the port at which the request was received;
   an interface/controller connected to the switch and to the data storage device, wherein the interface/controller has capability of receiving storage structure access requests from the switch and wherein the interface/controller has capability of granting access to the storage structure requested if the identified network system making the request has authority to access that storage structure as evidenced by the port of the switch at which the request was received and otherwise has capability of refusing access.

2. A data storage system as recited in claim 1, wherein the switch is a VLAN-capable switch.

3. A data storage system as recited in claim 1, wherein the switch is a port to address translation switch.

4. A data storage system as recited in claim 1, further comprising a port translation table, wherein the table comprises at least one entry comprising the identity of one of the ports and the identity of a virtual local area network specified as attached to that port.

5. A data storage system as recited in claim 1, further comprising a port translation table, wherein the table comprises at least one entry comprising the identity of one of the ports and the identity of the network system specified as attached to that port.

6. A data storage system as recited in claim 5, wherein the network system is a computer.

7. A data storage system as recited in claim 6, wherein the identities of computers in the entries of the port translation table comprise network addresses of the computers.

8. A data storage system as recited in claim 1, further having capability of comprising an access control list, wherein the list comprises at least one entry comprising the identity of one of the storage structures and the identity of at least one network system having authority to access that storage structure.

9. A data storage system as recited in claim 8, wherein the network system is a computer.

10. A data storage system as recited in claim 8, wherein the switch has capability of attaching to the access request the identity of the network system specified as attached to the specific port of the switch receiving the access request.

11. A data storage system as recited in claim 10, wherein the network system is a computer.

12. A computer-readable medium having computer-executable instructions for performing a method for limiting access to a data storage device, wherein the data storage device has capability of comprising more than one storage structure, the method comprising:
   at a port of a switch, receiving a request from a network system for access to one of the storage structures, wherein the network system is attached to the port and wherein ports of the switch are individually attachable to separate network systems;
   transferring the request from the switch to an interface/controller, wherein the interface/controller is connected to the switch and to the data storage device; and
   when the network system making the request has authority to access that storage structure as evidenced by the port of the switch at which the request was received, granting access to the storage structure requested; and otherwise,
   refusing such access.

13. The computer-readable medium as recited in claim 12, the method further comprising:
   isolating and identifying at least two virtual local area networks from knowledge of specific ports of the switch to which specified virtual local area networks are attached.

14. The computer-readable medium as recited in claim 12, the method further comprising:
   enabling connection of specific ports of the switch to specified network addresses.

15. The computer-readable medium as recited in claim 12, the method further comprising:

identifying a virtual local area network as connected to a specific port of the switch by accessing a port translation table.

16. The computer-readable medium as recited in claim 12, the method further comprising:

identifying a network system as connected to a specific port of the switch by accessing a port translation table.

17. The computer-readable medium as recited in claim 16, wherein the network system is a computer, and wherein the identity of the network system in the port translation table comprises the network address of the computer.

18. The computer-readable medium as recited in claim 12, the method further comprising:

accessing an access control list, wherein the list comprises at least one entry comprising the identity of one of the storage structures and the identity of at least one network system having authority to access that storage structure.

19. The computer-readable medium as recited in claim 18, the method further comprising:

attaching to the access request the identity of the network system specified as attached to the specific port of the switch receiving the access request.

20. A computer executable method for limiting access to a data storage device, wherein the data storage device has capability of comprising more than one storage structure, comprising:

at a port of a switch, receiving a request from a network system for access to one of the storage structures, wherein the network system is attached to the port and wherein ports of the switch are individually attachable to separate network systems;

transferring the request from the switch to an interface/controller, wherein the interface/controller is connected to the switch and to the data storage device; and when the network system making the request has authority to access that storage structure as evidenced by the port of the switch at which the request was received, granting access to the storage structure requested; and otherwise, refusing such access.

21. The computer executable method as recited in claim 20, the method further comprising:

isolating and identifying at least two virtual local area networks from knowledge of specific ports of the switch to which specified virtual local area networks are attached.

22. The computer executable method as recited in claim 20, the method further comprising:

enabling connection of specific ports of the switch to specified network addresses.

23. The computer executable method as recited in claim 20, the method further comprising:

identifying a virtual local area network as connected to a specific port of the switch by accessing a port translation table.

24. The computer executable method as recited in claim 20, the method further comprising:

identifying a network system as connected to a specific port of the switch by accessing a port translation table.

25. The computer executable method as recited in claim 24, wherein the network system is a computer, and wherein the identity of the network system in the port translation table comprises the network address of the computer.

26. The computer executable method as recited in claim 20, the method further comprising:

accessing an access control list, wherein the list comprises at least one entry comprising the identity of one of the storage structures and the identity of at least one network system having authority to access that storage structure.

27. The computer executable method as recited in claim 26, the method further comprising:

attaching to the access request the identity of the network system specified as attached to the specific port of the switch receiving the access request.

* * * * *